No. 781,157. PATENTED JAN. 31, 1905.
A. POWELL.
COUPLING FOR PIPES, CABLES, &c.
APPLICATION FILED JULY 9, 1901.
2 SHEETS—SHEET 1.
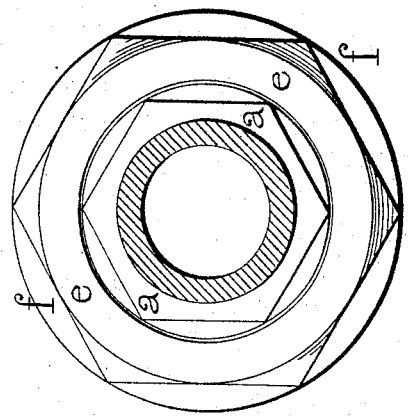
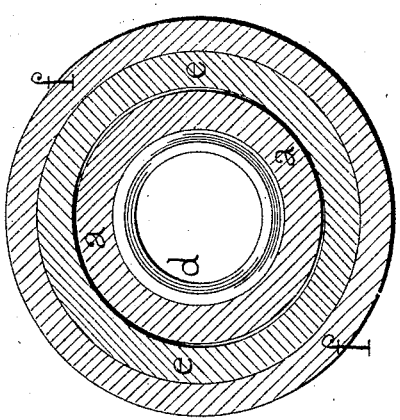
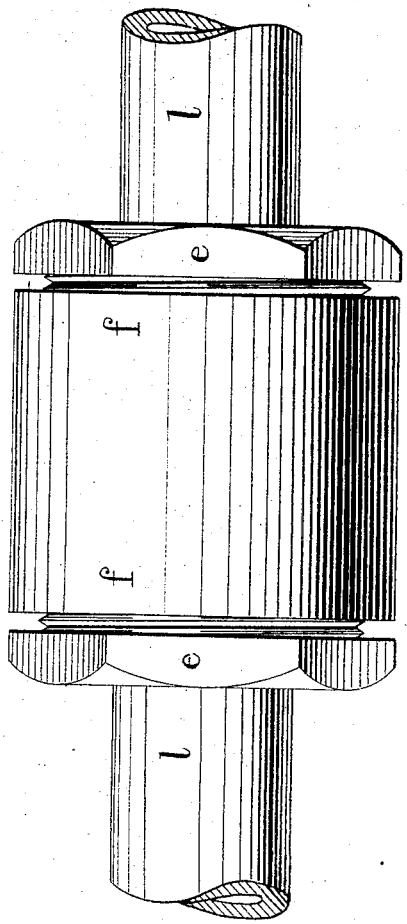
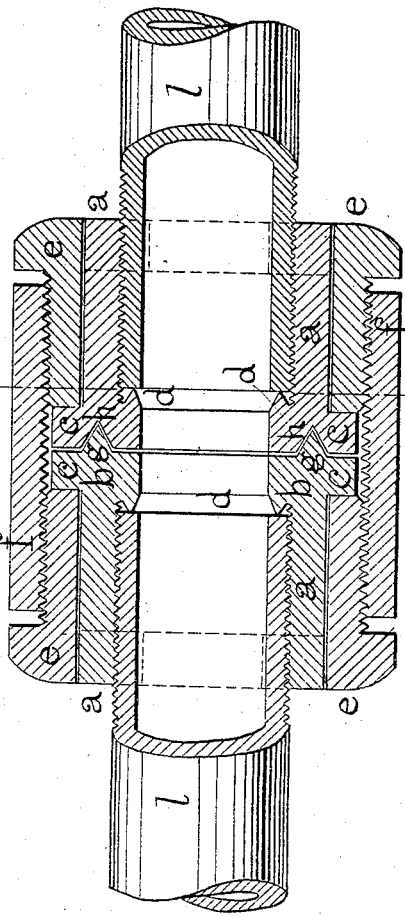
WITNESSES.
E. Howard.
Joseph Bates.
INVENTOR
Albert Powell
by Howard O'Brien
atty.

No. 781,157. PATENTED JAN. 31, 1905.
A. POWELL.
COUPLING FOR PIPES, CABLES, &c.
APPLICATION FILED JULY 9, 1901.

2 SHEETS—SHEET 2.

WITNESSES.
E. Howard.
Joseph Bates.

INVENTOR.
Albert Powell
by D. Orlando O'Brien
atty.

No. 781,157.

Patented January 31, 1905.

UNITED STATES PATENT OFFICE.

ALBERT POWELL, OF MANCHESTER, ENGLAND.

COUPLING FOR PIPES, CABLES, &c.

SPECIFICATION forming part of Letters Patent No. 781,157, dated January 31, 1905.

Application filed July 9, 1901. Serial No. 67,635.

*To all whom it may concern:*

Be it known that I, ALBERT POWELL, a British subject, and a resident of Manchester, in the county of Lancaster, England, have invented certain new and useful Improvements in Couplings for Pipes, Cables, or other Articles, of which the following is a specification.

This invention is designed to provide an improved construction of coupling or connection applicable for pipes, cables, rods, or other articles, either as a permanent or temporary connection.

It consists, essentially, of two sleeves with flanged ends, to which the ends of the pipe or article are securely attached, two clamping or locking nuts or screws fitting over said sleeves and abutting against the flanges and a screwed union or sleeve into which the nuts are screwed to force the faces of the sleeve-flanges tightly together to make a water, air, or steam tight joint, as may be required.

The invention will be fully described with reference to the accompanying drawings.

Figure 5:
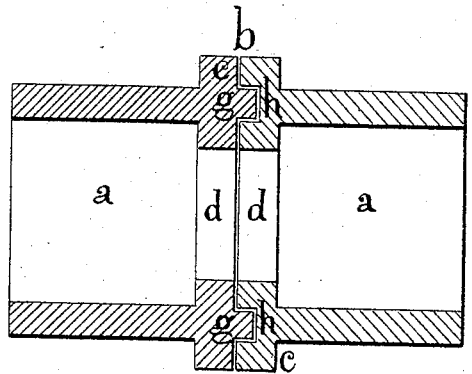
Figure 6:
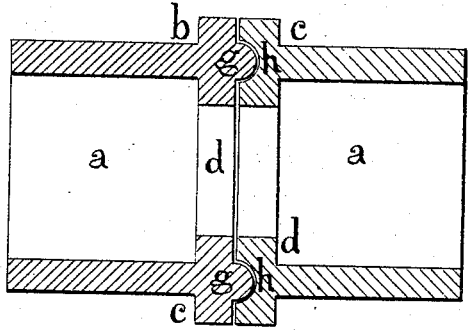
Figure 7:
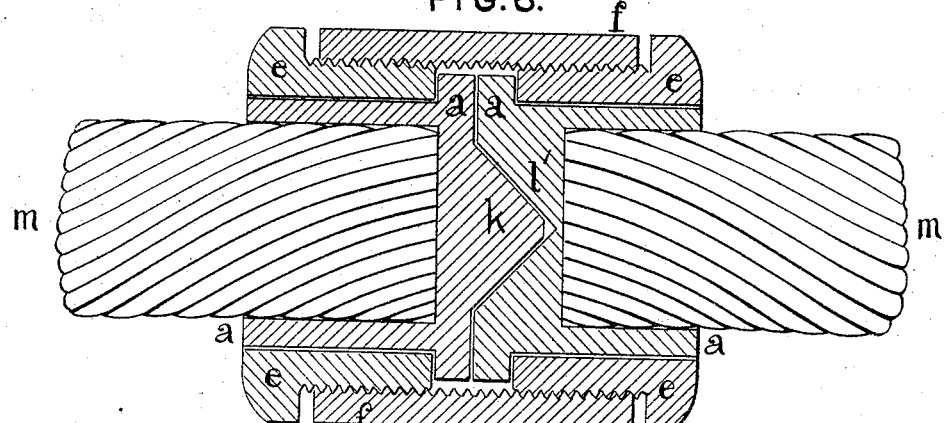

Figure 1 is a side elevation of the coupling as applied to hydraulic pipes; Fig. 2, longitudinal section of same; Fig. 3, end elevation; Fig. 4, transverse section on line $x\ x$, Fig. 2; Fig. 5, section of sleeve with modified form of face-joint; Fig. 6, section of sleeve with another form of face-joint; Fig. 7, section of coupling, showing modification when applied to electric cables.

The sleeves or coupling-pieces $a$ are secured to the end of the pipe or other article $l$ by screw-thread or by soldering or otherwise.

Each sleeve or coupling-piece $a$ is formed with a flange $b$ at one end, such flange extending both externally and internally, forming on the one side a close joint when the faces of the two flanges are forced together and at the other side forming an external and an internal flange $c$ and $d$. The internal flange $d$ serves as a face for the end of the pipe $l$ or other article to abut against, and the external flange $c$ serves as an abutment for a screw or nut to force the faces of the flanges tightly together.

Over each sleeve is loosely fitted a screw or nut $e$, screwing into a sleeve or union $f$, the ends of the screws $e$ engaging the external flanges $c$ of the coupling-pieces $a$. The screws $e$ when screwed into the union $f$ force the faces of the flanges tightly together, making a tight joint.

The face of the flanges $b$ of one coupling-piece $a$ are made with an angular or other projection $g$ and the face of the opposite flange with a corresponding recess $h$, into which the projection fits, thus making a close joint.

The depth of the internal flange $d$ may vary according to the thickness of the pipe or article to be connected. The angle and width of the projections $g$ and recesses or grooves $h$ may also be varied, according as circumstance may require.

To prevent unscrewing of the nuts or screws $e$, a check or lock nut may be applied behind them or a set-screw may be inserted.

For connecting electric cables $m$ the inner flange $d$ may be dispensed with, and conical ends $k$ and $l'$ may be provided upon the coupling-pieces $a$ to form a good electrical connection between the two, as shown in Fig. 7.

What I claim as my invention, and desire to protect by Letters Patent, is—

In a coupling for pipes, cables and other articles the combination with two coupling-sleeves with smooth exterior surfaces, and internal and external flanges upon their inner ends, to attach to the ends of the pipes of two identical externally-threaded tubular screws with smooth interior surfaces sliding over the coupling-sleeves and abutting against the back of the external flanges thereof, complementary recesses and projections on the face of the flanges and a union with a straight bore throughout its entire length and internally threaded at both ends with similar threads into the opposite ends of which the two identical tubular screws are screwed from opposite ends, substantially as described.

In witness whereof I have hereunto signed my name, in the presence of two subscribing witnesses, this 28th day of June, 1901.

ALBERT POWELL.

Witnesses:
   J. OWDEN O'BRIEN,
   B. TATHAM WOODHEAD.